(12) United States Patent
Ku

(10) Patent No.: US 6,896,227 B2
(45) Date of Patent: May 24, 2005

(54) UNIVERSAL ADJUSTING MECHANISM FOR TRIPODS

(76) Inventor: Heng-Chun Ku, 8F-10, No. 188, Chung-Hsian Rd., Ping-Chen City, Taoyuan Hsien (TW)

( * ) Notice: Subject to any disclaimer, the term of this patent is extended or adjusted under 35 U.S.C. 154(b) by 0 days.

(21) Appl. No.: 10/366,783

(22) Filed: Feb. 13, 2003

(65) Prior Publication Data

US 2004/0159754 A1 Aug. 19, 2004

(51) Int. Cl.⁷ .............................................. F16M 11/38
(52) U.S. Cl. .................. 248/170; 248/178.1; 248/184.1
(58) Field of Search .......................... 248/179.1, 183.2, 248/177.1, 178.1, 170, 183.1, 184.1, 188.6; 396/419, 428; 352/243; 403/145, 147–149

(56) References Cited

U.S. PATENT DOCUMENTS

| | | | | | |
|---|---|---|---|---|---|
| 2,318,633 A | * | 5/1943 | Ries | .......................... | 248/183.2 |
| 2,618,452 A | * | 11/1952 | Imhof | ...................... | 248/278.1 |
| 3,006,052 A | * | 10/1961 | Stickney et al. | ......... | 248/187.1 |
| 3,128,982 A | * | 4/1964 | Christopher | ............. | 248/183.2 |
| 4,247,069 A | * | 1/1981 | Kurz | ........................ | 248/183.2 |
| 4,249,817 A | * | 2/1981 | Blau | .......................... | 396/428 |
| 4,341,452 A | * | 7/1982 | Korling | ....................... | 396/428 |
| 4,457,610 A | * | 7/1984 | Kawazoe | ..................... | 396/428 |
| 4,562,985 A | * | 1/1986 | Nakatani | ................. | 248/183.2 |
| 4,763,151 A | * | 8/1988 | Klinger | ....................... | 396/419 |
| 4,886,230 A | * | 12/1989 | Jones et al. | ................. | 248/170 |
| 5,202,527 A | * | 4/1993 | Gracie | ......................... | 84/327 |
| 5,742,859 A | * | 4/1998 | Acker | ........................ | 396/419 |

* cited by examiner

Primary Examiner—Korie Chan

(57) ABSTRACT

An adjusting mechanism of a tripod includes an X-axis adjusting mechanism having an X-axis shaft, a Y-axis adjusting mechanism having a Y-axis shaft, a Z-axis adjusting mechanism having a Z-axis shad and a leg adjusting mechanism. The X-axis adjusting mechanism is connected to the Y-axis adjusting mechanism which is connected to the Z-axis adjusting mechanism. The X-axis shaft, the Y-axis shaft and the Z-axis shaft all intersect at one point. The leg adjusting mechanism has a base and three positioning members are located at equiangular positions around the base. Each positioning member has a first stepped portion and a second stepped portion that are located at different height and distance from the center of the base. Each positioning member is connected to a leg joint and an adjusting knob is connected to each leg joint. The first engaging member is engaged with the first stepped portion, or the second engaging member is engaged with the second stepped portion by rotating the adjusting knob so as to set the legs at two different angles.

6 Claims, 11 Drawing Sheets

UNIVERSAL ADJUSTING MECHANISM FOR TRIPODS

FIELD OF THE INVENTION

The present invention relates to a tripod that has an adjusting mechanism for orienting cameras.

BACKGROUND OF THE INVENTION

A conventional tripod generally includes three retractable legs which can be expanded on the floor and a support board which can be rotated in two directions so as to set the camera on the support board. Users are obviously not satisfied by the two-direction adjustment. Besides, photographers may use 23 degrees, or 55 degrees relative to a vertical plane when using the tripod but the conventional tripod can not be adjusted and fixed to the position conveniently. Furthermore, the conventional tripod is freely expanded and easily falls even if there is a minor impact. Therefore, the conventional tripod needs to be improved.

SUMMARY OF THE INVENTION

In accordance with one aspect of the present invention, an adjusting mechanism of a tripod is provided. The mechanism includes an X-axis adjusting mechanism having an X-axis shaft, a Y-axis adjusting mechanism having a Y-axis shaft, and a Z-axis adjusting mechanism having a Z-axis shaft. The X-axis adjusting mechanism is connected to the Y-axis adjusting mechanism which is in turn connected to the Z-axis adjusting mechanism. The X-axis shaft, the Y-axis shaft and the Z-axis shaft all intersect at one point.

In order to set the legs of the tripod at certain angles, the present invention provides a leg adjusting mechanism which has a base. Three positioning members are located at equi-angular positions around the base. Each positioning member has a first stepped portion and a second stepped portion. Both first and second stepped portions are located at different height and distance from the center of the base. Each positioning member is connected to a leg joint and an adjusting knob is connected to each leg joint. The first engaging member is engaged with the first stepped portion, or the second engaging member is engaged with the second stepped portion by rotating the adjusting knob so as to set the legs at 55 degrees or 23 degrees relative to a vertical line.

The primary object of the present invention is to provide a tripod that has a support board and can be adjusted in thee dimensions.

Another object of the present invention is to provide a tripod that can be easily set at 23 degrees or 55 degrees to meet the need of the users.

Yet another object of the present invention is to provide a tripod of which the legs can be expanded by a rotational way.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3-1 is a cross sectional view to show that springs and beads are installed between the rotation board and the frame;

DETAILED DESCRIPTION OF THE PREFERRED EMBODIMENT

Figure 1:
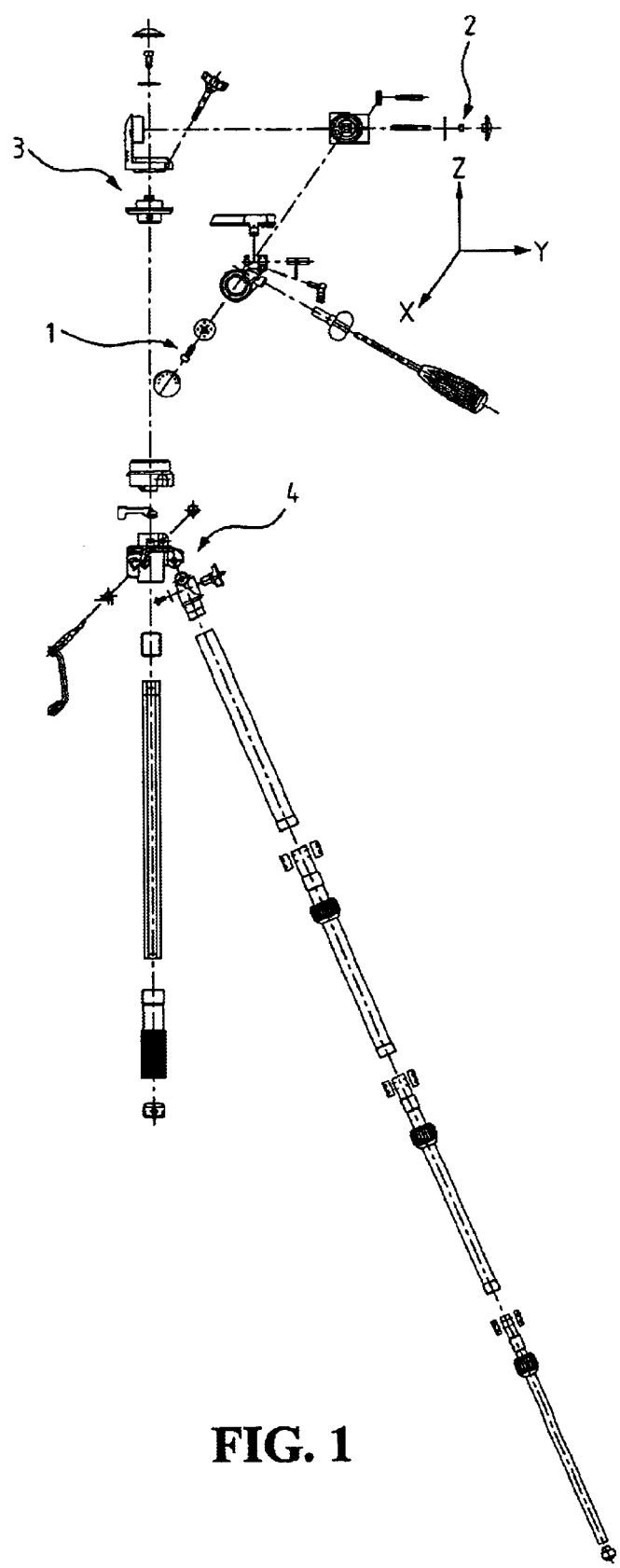
FIG. 1 is an exploded view to show the main rows of the tripod of the present invention.

Referring to FIG. 1, the present invention provides a tripod that comprises an X-axis adjusting mechanism 1, a Y-axis adjusting mechanism 2, and a Z-axis adjusting mechanism 3. A leg adjusting mechanism 4 is connected to the three adjusting mechanism 1, 2, 3.

Figure 2:
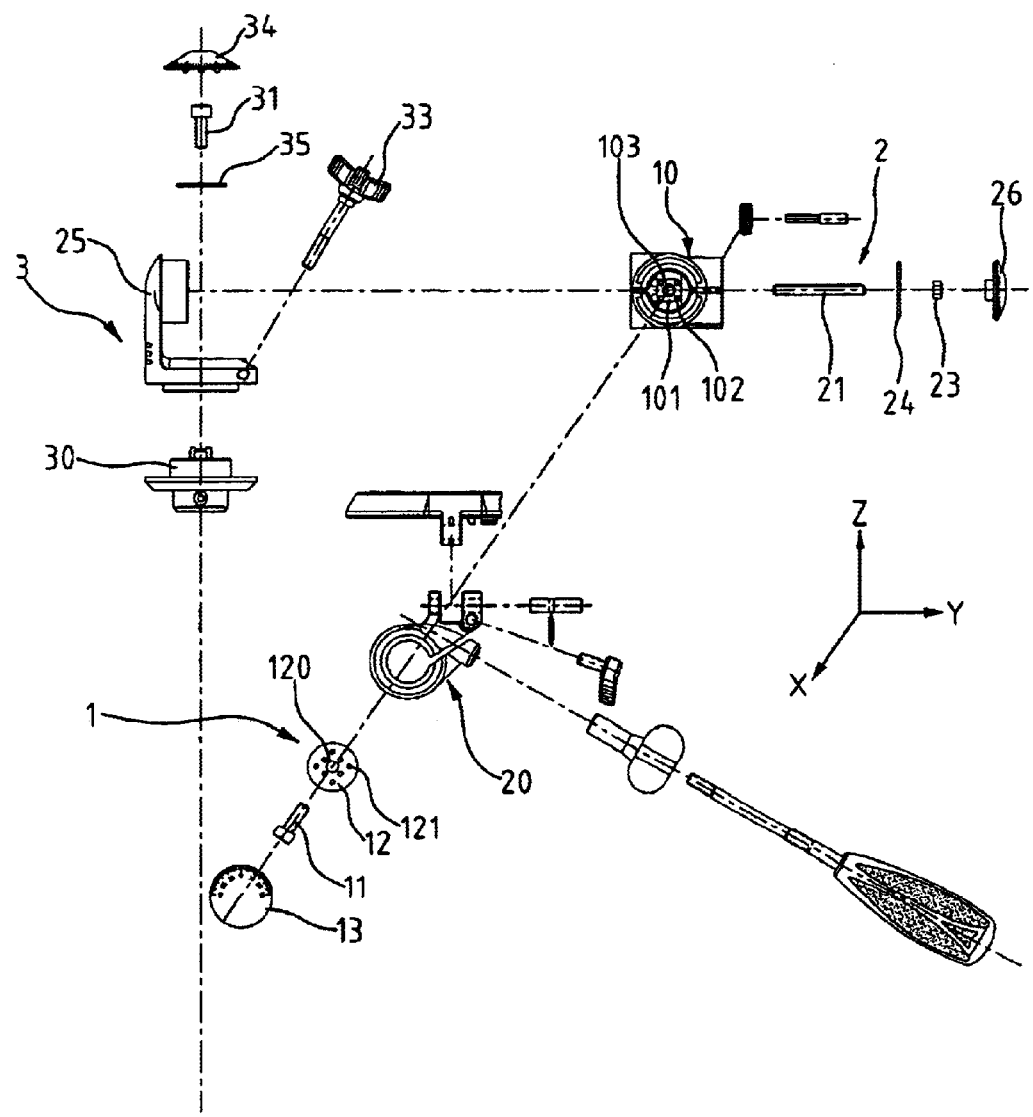
FIG. 2 shows the parts of the X-axis, Y-axis and Z-axis adjusting mechanism.
Figure 3:
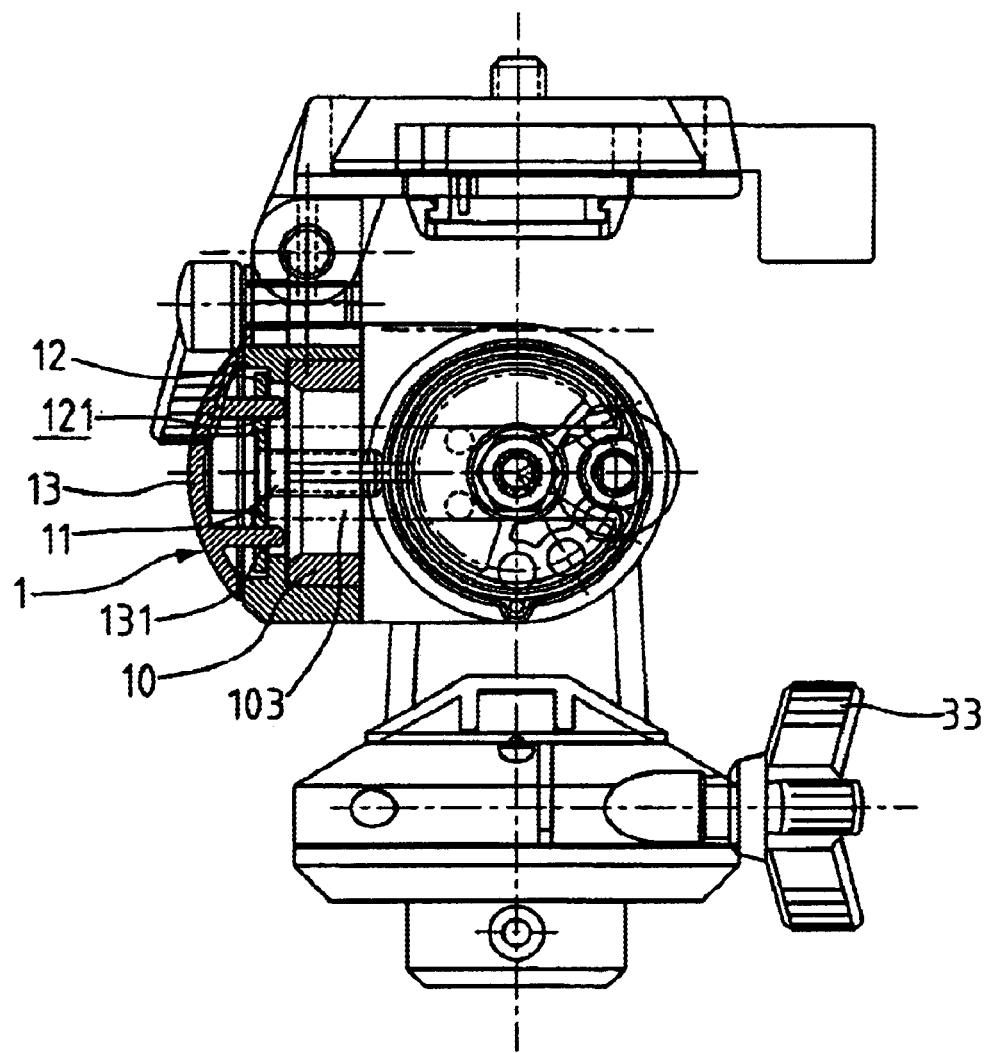
FIG. 3 shows a plane view of the X-axis adjusting mechanism.
Figures 1, 3:
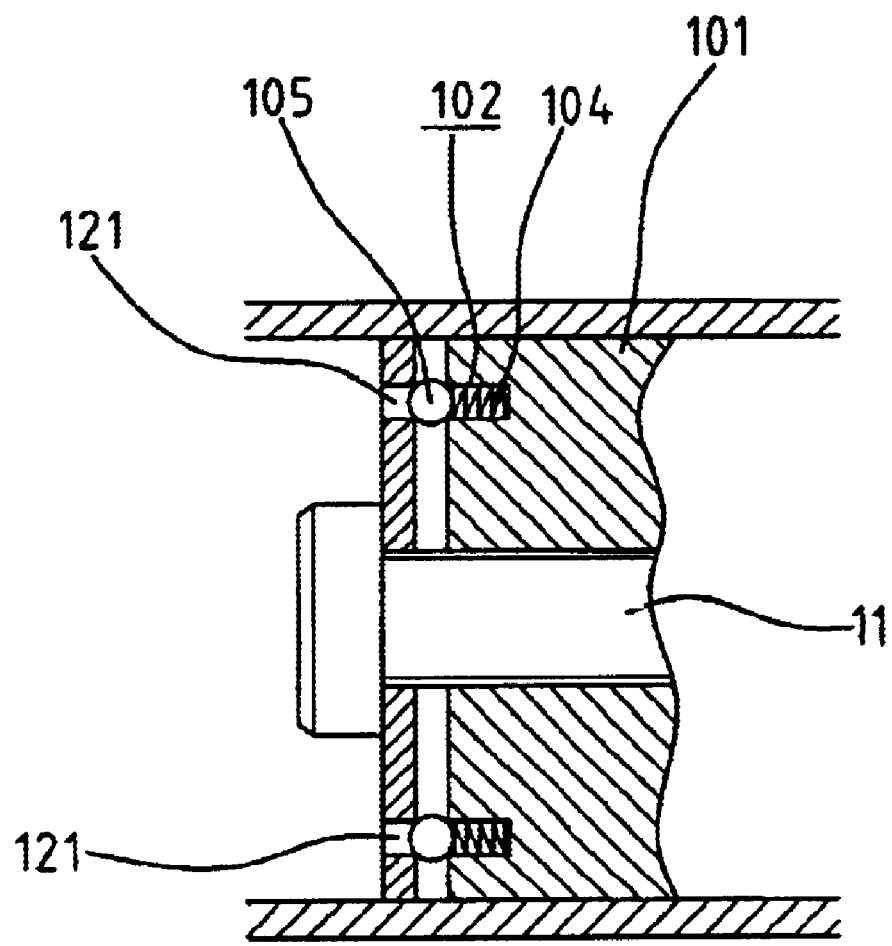
Figure 4:
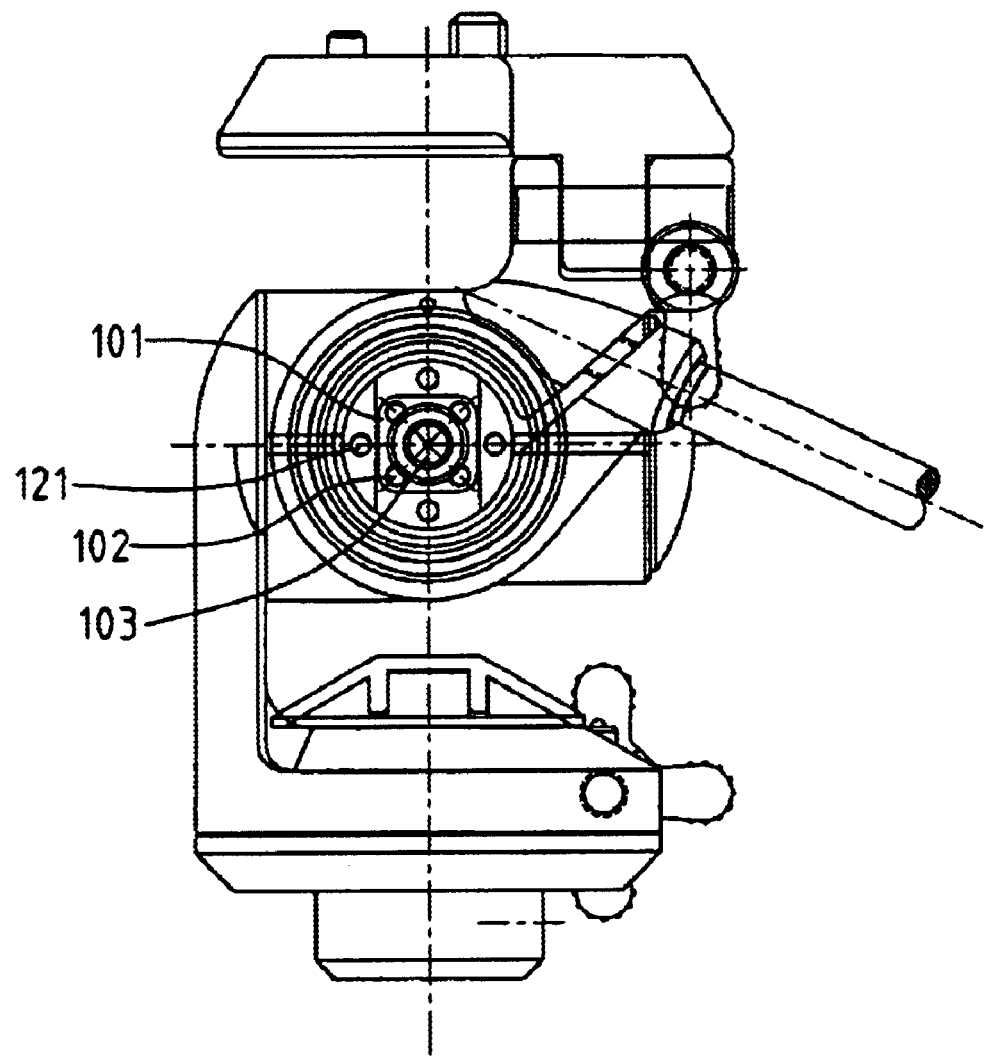
FIG. 4 is an end view to show the mechanism as illustrated in FIG. 3.

FIGS. 2 to 4 show the X-axis adjusting mechanism 1 which comprises a first base member 10, an X-axis shaft 11, a rotation board 12 and an X-axis scale plate 13. The first base member 10 has a center part 101 and a central hole 103 is defined in the center of an end of the center part 101. Four holes 102 are defined around the central hole 103 at equi-angular positions. The rotation board 12 has a central hole 120 and eight holes 121 are defined around the central hole 120. The central hole 120 and the eight holes 121 are arranged as a matrix form. The X-axis shaft 11 can be a bolt which extends through the central hole 120 of the rotation board 12 and threadedly engaged with the central hole 103 of the center part 101. Four of the eight holes 121 in the rotation board 12 are in alignment with the holes 102 in the center part 101. Springs 104 and beads 105 as shown in FIG. 3-1 are installed between the holes 121 and 102. By the engagement of the beads 105 in the holes 102, the rotation board 12 is set in position. The X-axis scale plate 13 has four rods 131 which extend through the other four holes 121 in the rotation board 12 so that the first base member 10 can be rotated about the X-axis shaft 11. When the first base member 10 is rotated relative to the rotation board 12 to a desired angle, each bead 105 is engaged with another hole 102 and the angle can be checked by the X-axis scale plate 13.

Figure 5:
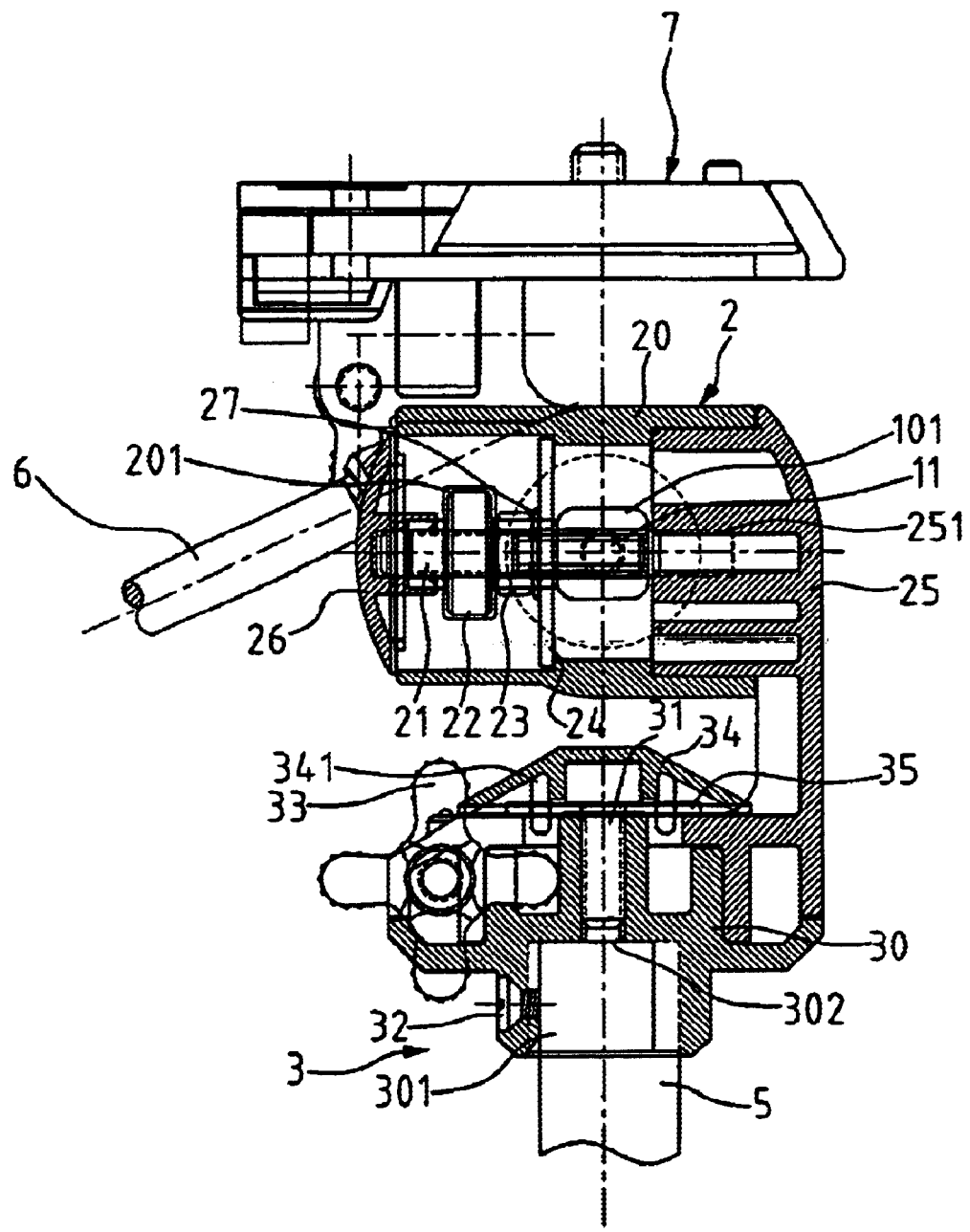
FIG. 5 shows the X-axis adjusting mechanism and the Y-axis adjusting mechanism.

FIGS. 2 and 5 show the Y-axis adjusting mechanism 2 which comprises a second base member 20, a Y-axis shaft 21, a support member 22, a nut 23, a board 24, a side cover 25, a Y-axis scale plate 26 and a resilient plate 27. The second base member 20 has a hollow interior. The support member 22 can be a bearing. The Y-axis shaft 21 has outer threads and extends through the support member 22, the nut 23, the resilient plate 27 and the board 24, and then it is threadedly engaged with the threaded hole 251 in the side cover 25. The Y-axis scale plate 26 is connected to the Y-axis shaft 21 so that the second base member 20 can be rotated relative to the Y-axis shaft 21. The angle that is rotated can be checked by the Y-axis scale plate 26.

FIGS. 2 and 5 also show the Z-axis adjusting mechanism 3 which comprises a support base 30, a Z-axis shaft 31, a Z-axis scale plate 34, and a washer 35. The support base 30 has a bottom hole 301 for receiving a central shaft 5 of the tripod and a bolt 32 extends through the support base 30 and contacts against a side of the central shaft 5 so as to fix the central shaft 5 and the support base 30. The support base 30 has an opening on a side thereof and two threaded holes are defined in the two opposite insides of the opening. A butterfly-screw 33 extends through the two threaded holes so that when the opening of the support base 30 closes, the central shaft 5 is securely clamped and limited from rotation horizontally. When the butterfly-screw 33 is unscrewed, the central shaft 5 can be rotated in the horizontal direction. The Z-axis shaft 31 extends through the washer 35 and is threadedly engaged with the threaded hole 302 defined in the top of the support base 30. The rods 341 on the Z-axis scale plate 34 are inserted in the holes in the washer 35 so that the Z-axis scale plate 34 and the washer 35 are connected with each other. The Y-axis adjusting mechanism 2 is connected to the support base 30 by the side cover 25 so that the Y-axis adjusting mechanism 2 can be rotated relative to the support base 30.

The X-axis adjusting mechanism 1, the Y-axis adjusting mechanism 2 and the Z-axis adjusting mechanism 3 are connected to a support on which the support board 7 is connected. Camera is then supported on the support board 7. A control bar 6 is connected to the support and may control the support to rotate about the X-axis shaft 11, the Y-axis shaft 21 and the Z-axis shaft 31.

Figure 6:
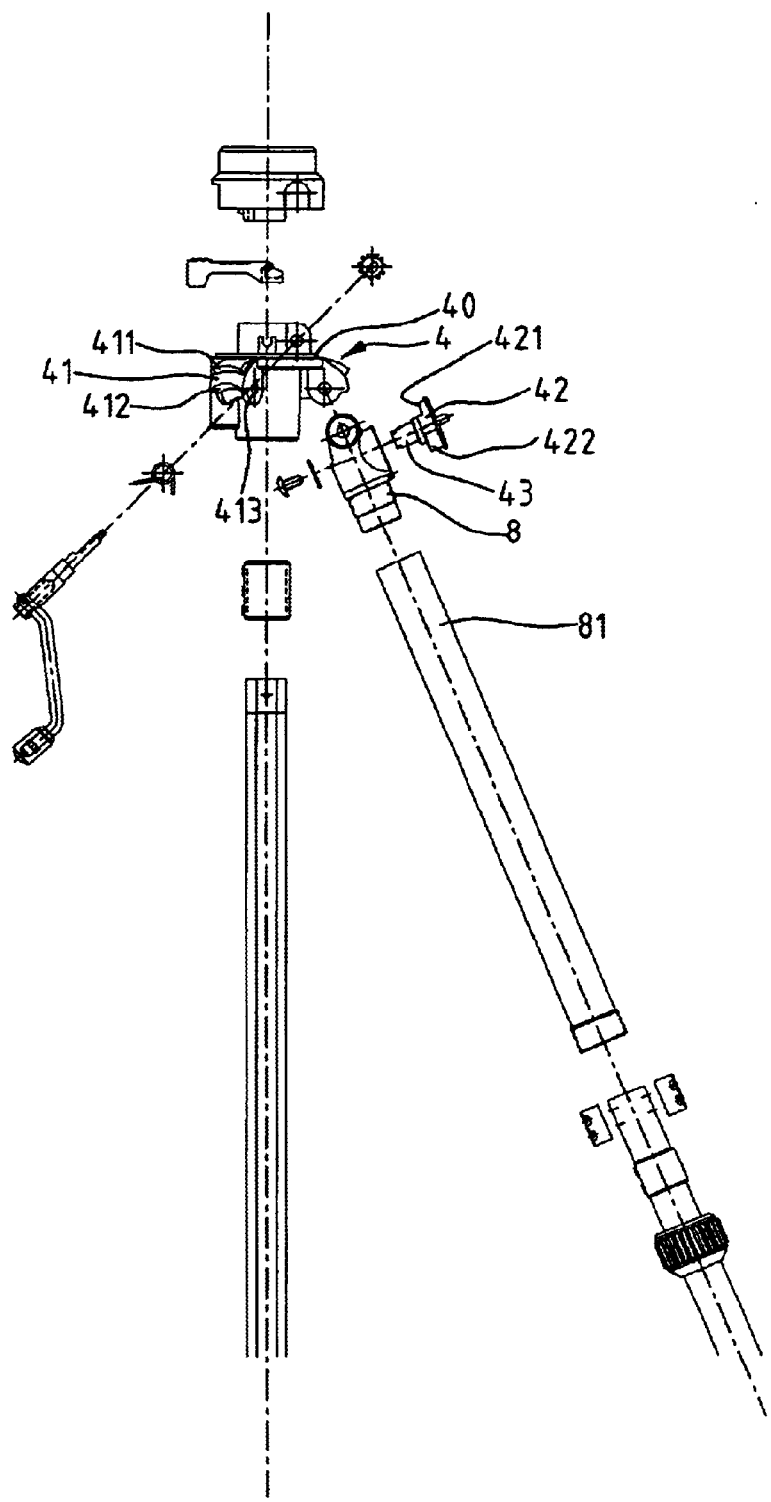
FIG. 6 is an exploded view to show the parts of the leg adjusting mechanism of the tripod.
Figure 7:
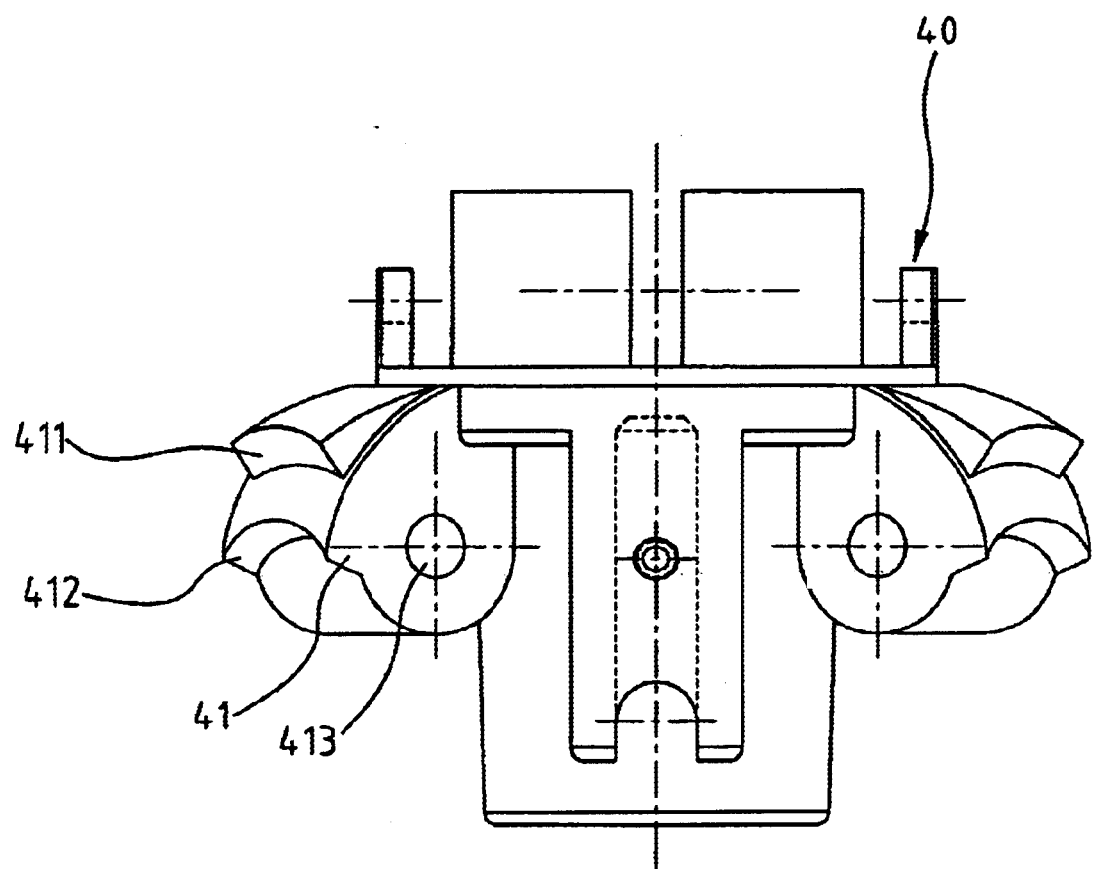
FIG. 7 is a plane view to show the base of the leg adjusting mechanism.
Figure 8:
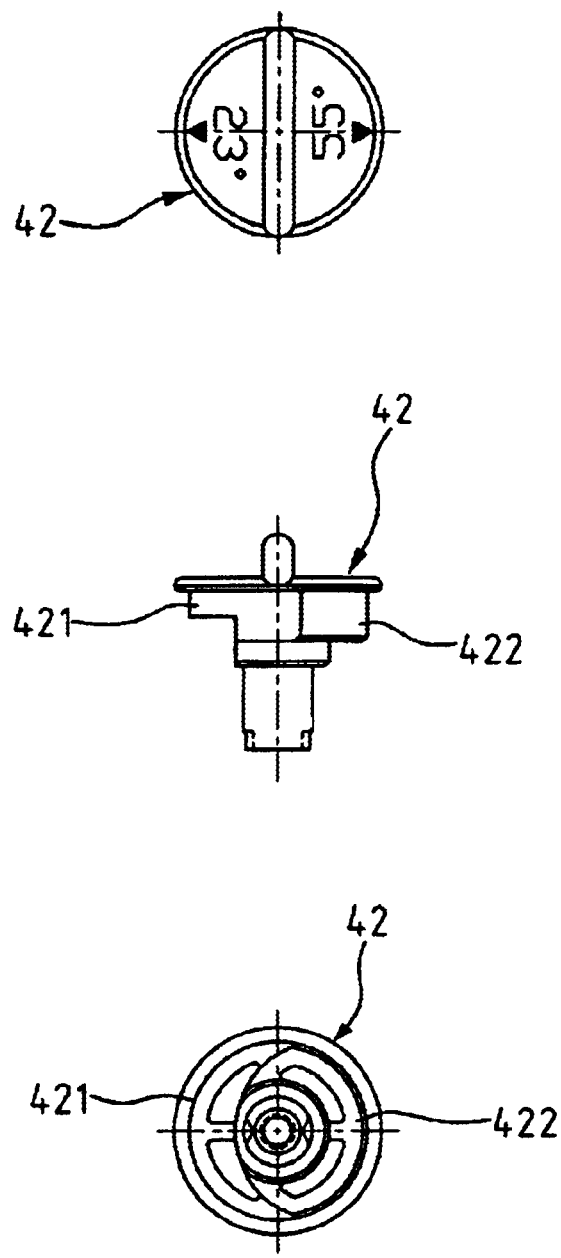
FIG. 8 shows the top view, the front view and the bottom view of the adjusting knob for the leg adjusting mechanism.
Figure 9:
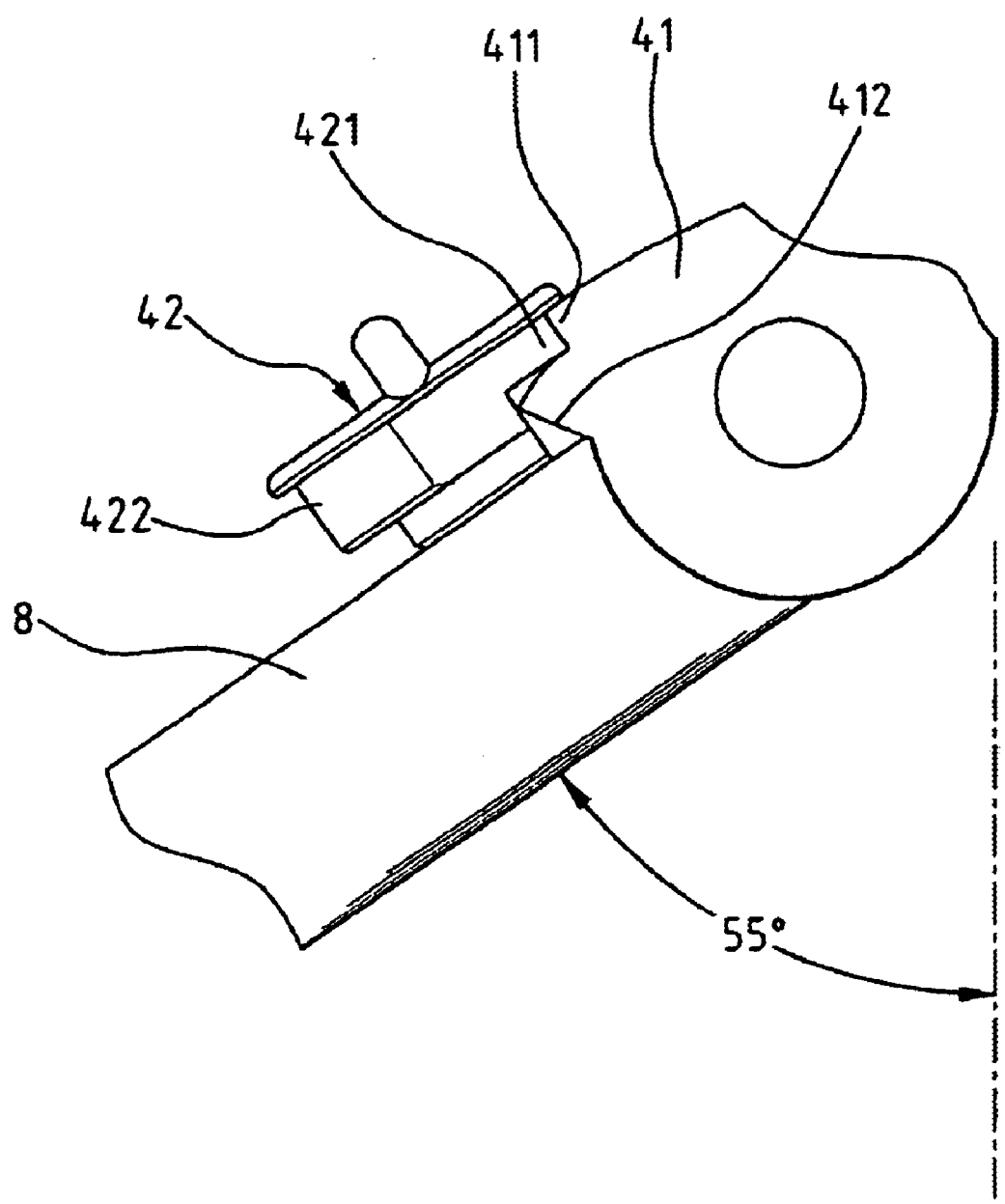
FIG. 9 shows the adjusting knob on the base for adjusting the inclination of the legs positioned at 55 degrees.
Figure 10:
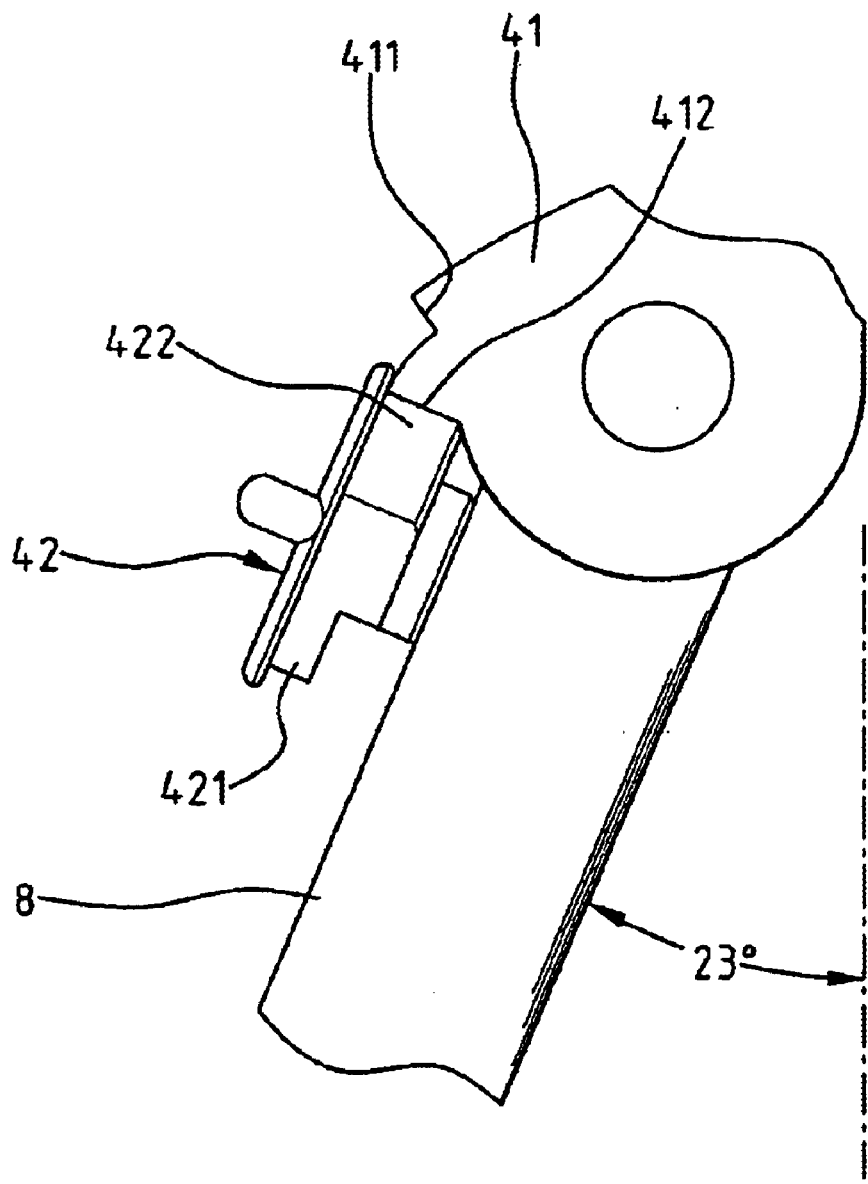
FIG. 10 shows the adjusting knob on the base for adjusting the inclination of the legs positioned at 23 degrees.

FIGS. 6 to 8 show the leg adjusting mechanism 4 which comprises a base 40 with three positioning members 41 at equiangular positions. Each positioning member 41 includes a first stepped portion 411 which is close to the base 40 and located at a high position, and a second stepped portion 412 which is away from the base 40 and located at a low position. Each of the positioning members 41 has a hole 413. A pin extends through the hole of the leg joint 8 and the hole 413 to connect the leg joint 8 to the positioning member 41 and allow the leg joint 8 to be rotated relative to the base 40. The leg joint 8 is connected to the leg 81. Each leg joint 8 is pivotably connected to an adjusting knob 42 which has a first engaging member 421 and a second engaging member 422 on a bottom thereof. The two engaging members 421, 422 are oriented in opposite directions. By rotating the adjusting knob 42, the first engaging member 421 is engaged with the first stepped portion 411 on the base 40, or the second engaging member 422 is engaged with the second stepped portion 422 on the base 40. Therefore, the leg joint 8 and the leg 81 can be positioned at two angles. The vertical surface of each of the first stepped portion 411 and the second stepped portion 412 is a concave surface. The first engaging member 421 and the second engaging member 422 both have a convex side to match the concave surface. The first engaging member 421 and the second engaging member 422 are cam-shaped and the contour of the cam is designed so that when the first engaging member 421 is engaged with the first stepped portion 411, the leg 81 is positioned at 55 degrees relative to a vertical line as shown in FIG. 9. When the second engaging member 422 is engaged with the second stepped portion 412, the leg 81 is positioned at 23 degrees relative to a vertical line as shown in FIG. 10.

While we have shown and described the embodiment in accordance with the present invention, it should be clear to those skilled in the art that further embodiments may be made without departing from the scope of the present invention.

What is claimed is:

1. An adjusting mechanism of a tripod having legs wherein the tripod comprising: an upper adjustment assembly disposed on an upper end of the tripod, said upper adjustment assembly comprising:

an X-axis adjusting mechanism having a first base member and an X-axis shaft extending through the first base member;

a Y-axis adjusting mechanism having a second base member and a Y-axis shaft extending through the second base member;

a Z-axis adjusting mechanism having a third base member and a Z-axis shaft extending though the third base member;

and a lower adjustment assembly for said legs of said tripod, said lower adjustment assembly comprising:

a leg adjusting mechanism having a base and three positioning members located at equiangular positions around the base, each positioning member having a first stepped portion which is located at a position and close to a center of the base, and a second stepped portion which is located at a position away from the center of the base, each positioning member connected to a leg joint which is connected to an adjusting knob, the adjusting knob having a first engaging member and a second engaging member on a bottom thereof;

wherein the first engaging member is oriented in an opposite direction to the second engaging member, and wherein the first engaging member is engaged with the first stepped portion, or the second engaging member is engaged with the second stepped portion by rotating the adjusting knob so as to set a leg connected to the leg joint at two different angles relative to a vertical line.

2. The adjusting mechanism of a tripod as claimed in claim 1, wherein the X-axis adjusting mechanism includes a rotation board and an X-axis scale plate, the first base member having a center part which has a central hole (103) defined in a center of an end thereof, four holes (102) defined around the central hole (103) at equiangular positions, the rotation board having a central hole (120) and eight holes (121) defined around the central hole (120) at equiangular positions, the eight holes (121) and the central hole (120) being arranged in a matrix form, the X-axis shaft extending through the central hole (120) of the rotation board and engaged with the central hole (103) of the center part, four of the eight hole (121) of the rotation board being in alignment with the four holes (102) of the center part, springs and beads being located between the aligned holes (121) and holes (102), the X-axis scale plate having four rods which extend through the other four holes (121) of the rotation board.

3. The adjusting mechanism of a tripod as claimed in claim 1, wherein the Y-axis adjusting mechanism comprises a board, a resilient plate, a nut, a support member, a Y-axis scale plate and a side cover, the Y-axis shaft having outer threads and extending through the support member, the nut, the resilient plate and the board, then threadedly engaged with a threaded hole (251) in the side cover so as to connect the Y-axis scale plate to the Y-axis shaft.

4. The adjusting mechanism of a tripod as claimed in claim 1, wherein the Z-axis adjusting mechanism comprises a support base, a washer and a Z-axis scale plate, the support base connected to the Z-axis shaft at a bottom thereof and the Z-axis shaft extending through the washer and engaged with the top of the support base, the Z-axis scale plate fixed to the washer and the Y-axis adjusting mechanism connected to the support base and capable of rotation relative to the support base.

5. The adjusting mechanism of a tripod as claimed in claim 1; wherein the first stepped portion has a concave vertical surface matched with a convex side surface of the first engaging member, and the second stepped portion has a concave vertical surface matched with a convex side surface of the second engaging member.

6. The adjusting mechanism of a tripod as claimed in claim 1, wherein when the first engaging member is engaged with the first stepped portion, the leg is set at 55 degrees relative to the vertical line, and when the second engaging member is engaged with the second stepped portion, the leg is set at 23 degrees relative to the vertical line.

* * * * *